United States Patent
Dong et al.

(10) Patent No.: US 9,195,100 B2
(45) Date of Patent: Nov. 24, 2015

(54) ARRAY SUBSTRATE, LIQUID CRYSTAL PANEL AND DISPLAY DEVICE WITH PIXEL ELECTRODE AND COMMON ELECTRODE WHOSE PROJECTIONS ARE OVERLAPPED

(71) Applicants: BOE TECHNOLOGY GROUP CO., LTD., Beijing (CN); CHENGDU BOE OPTOELECTRONICS TECHNOLOGY CO., LTD., Sichuan (CN)

(72) Inventors: Xiangdan Dong, Beijing (CN); Minghua Xuan, Beijing (CN); Young Yik Ko, Beijing (CN); Weiyun Huang, Beijing (CN)

(73) Assignees: BOE TECHNOLOGY GROUP CO., LTD., Beijing (CN); CHENGDU BOE OPTOELECTRONICS TECHNOLOGY CO., LTD., Chengdu, Sichuan (CN)

( * ) Notice: Subject to any disclaimer, the term of this patent is extended or adjusted under 35 U.S.C. 154(b) by 180 days.

(21) Appl. No.: 13/704,696
(22) PCT Filed: Sep. 24, 2012
(86) PCT No.: PCT/CN2012/081844
§ 371 (c)(1),
(2) Date: Dec. 17, 2012
(87) PCT Pub. No.: WO2013/078903
PCT Pub. Date: Jun. 6, 2013

(65) Prior Publication Data
US 2014/0049741 A1 Feb. 20, 2014

(30) Foreign Application Priority Data
Dec. 1, 2011 (CN) .............................. 201110392905

(51) Int. Cl.
*G02F 1/1343* (2006.01)
(52) U.S. Cl.
CPC .................... *G02F 1/134309* (2013.01); *G02F 2001/134381* (2013.01)

(58) Field of Classification Search
CPC .................... G02F 1/133707; G02F 1/134363; G02F 1/136213; G02F 1/1362; G02F 2001/134318; G02F 2201/40; H01L 27/124
USPC ............................................ 349/141; 257/49
See application file for complete search history.

(56) References Cited

U.S. PATENT DOCUMENTS

| 7,999,892 B2 * | 8/2011 | Kimura et al. ................ 349/114 |
| 2005/0174521 A1 * | 8/2005 | Nishida et al. ................ 349/141 |

(Continued)

FOREIGN PATENT DOCUMENTS

| CN | 101078824 A | 11/2007 |
| CN | 101248388 A | 8/2008 |

(Continued)

OTHER PUBLICATIONS

First Chinese Office Action dated Dec. 19, 2013; Appln. No. 201110392905.4.

(Continued)

*Primary Examiner* — Huyen Ngo
(74) *Attorney, Agent, or Firm* — Ladas & Parry LLP

(57) ABSTRACT

An array substrate, a liquid crystal panel and a display device are disclosed. The array substrate is provided with a pixel electrode layer and a common electrode layer, the common electrode layer is provided with a plurality of common electrodes, and the pixel electrode layer is provided with a plurality of pixel electrodes, and projection of each common electrode projected in a vertical direction onto the pixel electrode layer, overlaps or partially overlaps with a corresponding pixel electrode, respectively. In the liquid crystal panel, since a pixel electrode and an adjacent common electrode have an overlap there between along a light incident direction, it will not produce a non-uniform light-transmission phenomenon at a periphery of a pixel electrode, and therefore can achieve a more uniform light-transmission effect.

12 Claims, 3 Drawing Sheets

(56) References Cited

U.S. PATENT DOCUMENTS

| | | |
|---|---|---|
| 2007/0177090 A1 | 8/2007 | Shimomaki |
| 2007/0273819 A1 | 11/2007 | Kawasaki et al. |
| 2009/0237342 A1 | 9/2009 | Maede et al. |
| 2014/0061646 A1* | 3/2014 | Liu .................................. 257/49 |

FOREIGN PATENT DOCUMENTS

| | | |
|---|---|---|
| CN | 101539701 A | 9/2009 |
| CN | 101539701 B | 3/2011 |
| JP | 2008-032898 A | 2/2008 |
| KR | 20110054727 A | 5/2011 |

OTHER PUBLICATIONS

International Search Report mailed Jan. 3, 2013; PCT/CN2012/081844.
International Prelinimatry Report on Patentability Issued Jun. 3, 2014 Appln. No. PCT/CN2012/081844.
Second Chinese Office Action Appln. No. 201110392905.4; Dated Sep. 28, 2014.
Third Chinese Office Action dated Mar. 30, 2015; Appln. No. 201110392905.4.

* cited by examiner

ARRAY SUBSTRATE, LIQUID CRYSTAL PANEL AND DISPLAY DEVICE WITH PIXEL ELECTRODE AND COMMON ELECTRODE WHOSE PROJECTIONS ARE OVERLAPPED

TECHNICAL FIELD

Embodiments of the present invention relate to an array substrate, a liquid crystal panel and a display device.

BACKGROUND

In a thin film transistor liquid crystal display (TFT-LCD), a voltage is applied between a pixel electrode (e.g., an ITO (indium-tin oxide) electrode) and a common electrode (e.g., an ITO electrode) to form an electric field; by controlling the magnitude of the voltage, and thus controlling the rotation degrees of liquid crystal molecules, a light valve is achieved.

Depending on different arrangements of positive and negative electrodes, a TFT-LCD may, in terms of structures, comprise two types: an in-plane switching (IPS) type and an advanced super dimension switching (ADSDS or ADS) type. In a liquid crystal display of an IPS-type display mode, spacing between electrodes is very small, and an in-plane electric field is generated between electrodes when a voltage is applied; liquid crystal can only make in-plane rotation in order to act as a light valve, and therefore, the light transmission is restrained. In a liquid crystal display of an ADS-type display mode, a multi-dimensional electric field is formed from an electric field generated from edges of slit-electrodes in a same plane and an electric field generated between a slit-electrode layer and a plate-like electrode layer, enabling liquid crystal molecules in all orientations between the slit-electrodes and directly above the electrodes within a liquid crystal cell to rotate, thereby improving work efficiency of the liquid crystal and increasing light transmission efficiency. The ADS technology can improve image quality of a TFT-LCD product, and has advantages of high resolution, high transmittance, low power consumption, wide viewing angle, high aperture ratio, low chromatic aberration, and free of push Mura, etc.

As shown in FIG. 1, it is a cross-sectional view of a structure of a conventional ADS-type display. The structure of the ADS-type display comprises: a color-filter substrate C and an array substrate A, as well as a liquid crystal layer 5 filled between the color-filter substrate C and the array substrate A. The color-filter substrate C comprises a glass substrate 2 and a color-filter layer 6, and the array substrate A comprises a glass substrate 71, a pixel electrode layer 3, a common electrode layer 4 and an insulating layer 72. In addition, polarizers 1 are affixed to both the respective outer sides of the color-filter substrate C and of the array substrate A. Positive and negative electrodes of the pixel electrode layer (plate-like electrode) 3 and the common electrode layer (slit-electrode) 4 are separated by the insulating layer 72 and thus arranged overlapped. During operation, the above-described electrode layers, after power is supplied, produce a multi-dimensional electric field, causing all liquid crystal molecules between the electrodes and above the electrodes to rotate within a plane of the panel.

FIG. 2 is a schematic structural view for illustrating pixel electrodes (e.g., ITO electrodes) 31 in the pixel electrode layer 3 and common electrodes (e.g., ITO electrodes) 41 of the common electrode layer 4, in the structure of the above-described conventional ADS-type display. As to a consideration of aperture ratio, capacitive coupling effect, and other factors in the design, a certain distance is present between an edge of the pixel electrode 31 and an edge of the common electrode 41, which will produce a non-uniform light-transmission phenomenon on edges of a pixel, causing a non-uniform light-transmission effect of the liquid crystal display as a whole.

SUMMARY

Embodiments of the present invention provide an array substrate, a liquid crystal panel and a display device, for solving the problem of non-uniform light-transmission effect of an existing liquid crystal panel.

One aspect of the present invention provides an array substrate, the array substrate comprising a pixel electrode layer and a common electrode layer, wherein the common electrode layer is provided with a plurality of common electrodes, and the pixel electrode layer is provided with a plurality of pixel electrodes, and wherein projection of each common electrode projected in a vertical direction onto the pixel electrode layer, overlaps or partially overlaps with a corresponding pixel electrode, respectively.

For example, the pixel electrode layer comprises a first pixel electrode and a second pixel electrode adjacent to each other, and the common electrode layer comprises a first common electrode located over a data line, and projection lines of two opposite edges of the first common electrode projected in a vertical direction onto the pixel electrode layer, are respectively located on the first pixel electrode and on the second pixel electrode.

For example, projection lines of adjacent edges of the first pixel electrode and the second pixel electrode, projected in a vertical direction on the common electrode layer, are both located on the first common electrode.

For example, the common electrode layer further comprises a second common electrode, and projection lines of two opposite edges of the second common electrode, projected in a vertical direction onto the pixel electrode layer, are located on a same pixel electrode.

For example, the common electrode layer is parallel to the pixel electrode layer; moreover, the common electrode layer is located above or below the pixel electrode layer.

Another aspect of the present invention provides a liquid crystal panel, comprising an opposing substrate and an array substrate; the array substrate comprises a pixel electrode layer and a common electrode layer, wherein the common electrode layer is provided with a plurality of common electrodes, and the pixel electrode layer is provided with a plurality of pixel electrodes, and wherein projection of each common electrode, projected in a vertical direction onto the pixel electrode layer, overlaps or partially overlaps with a corresponding pixel electrode.

Further another aspect of the present invention provides a display device, comprising an array substrate; the array substrate comprises a pixel electrode layer and a common electrode layer, wherein the common electrode layer is provided with a plurality of common electrodes, and the pixel electrode layer is provided with a plurality of pixel electrodes, and wherein projection of each common electrode projected in a vertical direction onto the pixel electrode layer, overlaps or partially overlaps with a corresponding pixel electrode.

For example, in the display device as described above, the pixel electrode layer comprises a first pixel electrode and a second pixel electrode adjacent to each other, and the common electrode layer comprises a first common electrode located over a data line; projection lines of two opposite edges of the first common electrode, projected in a vertical direction onto the pixel electrode layer, are respectively located on the first pixel electrode and on the second pixel electrode.

For example, in the display device as described above, the common electrode layer further comprises a second common electrode, and projection lines of two opposite edges of the second common electrode, projected in a vertical direction onto the pixel electrode layer, are located on a same pixel electrode.

For example, in the display device as described above, the common electrode layer is parallel to the pixel electrode layer, and the common electrode layer is located above the pixel electrode layer.

In a liquid crystal panel provided by a specific embodiment of the present invention, since a pixel electrode and an adjacent common electrode overlap each other in a vertical direction along a light incident direction (perpendicular to directions of the pixel electrode layer and the common electrode layer), a non-uniform light-transmission phenomenon does not occur at a periphery of the pixel electrode, and a more uniform light-transmission effect can be achieved.

BRIEF DESCRIPTION OF THE DRAWINGS

In order to clearly illustrate the technical solutions of the embodiments of the invention, the drawings of the embodiments will be briefly described in the following; it is obvious that the described drawings are only related to some embodiments of the invention and thus are not limitative of the invention.

DETAILED DESCRIPTION OF THE PREFERRED EMBODIMENTS

In order to make objects, technical details and advantages of the embodiments of the invention apparent, the technical solutions of the embodiments will be described in a clearly and fully understandable way in connection with the drawings related to the embodiments of the invention. It is obvious that the described embodiments are just a part but not all of the embodiments of the invention. Based on the described embodiments herein, those skilled in the art can obtain other embodiment(s), without any inventive work, which should be within the scope of the invention.

First Embodiment

Figure 3:
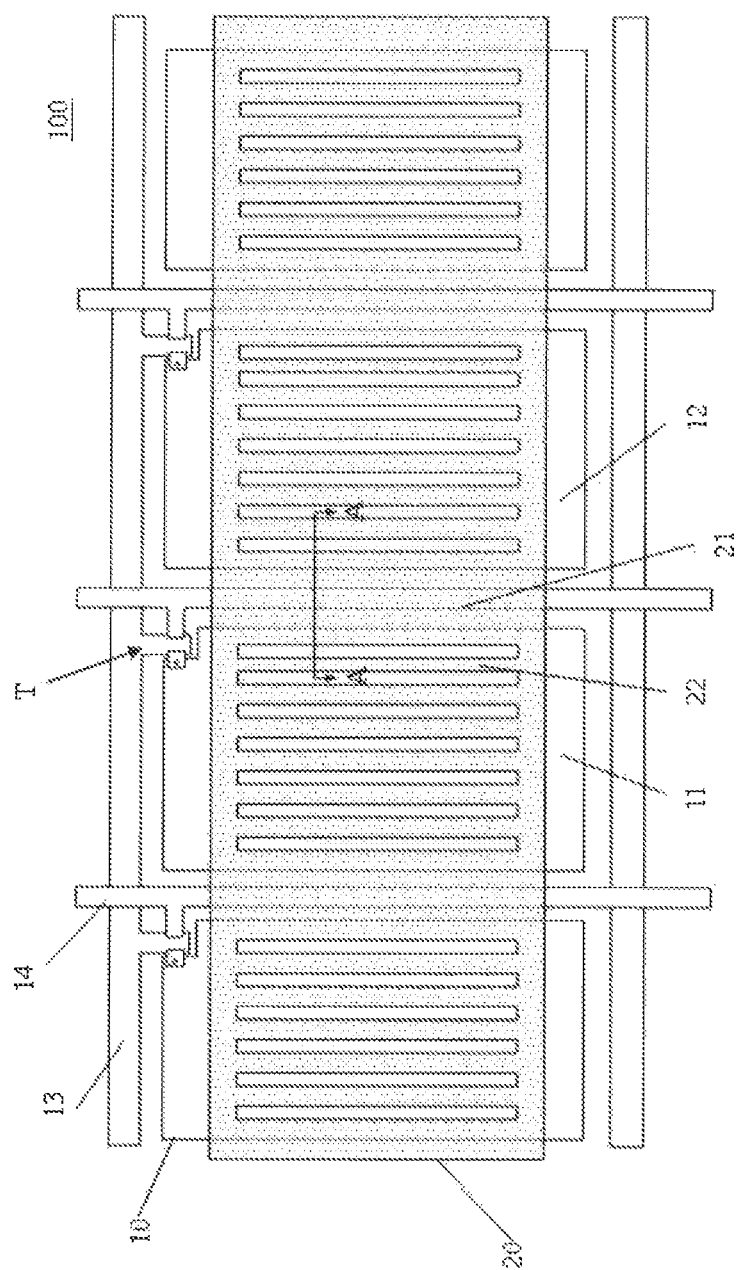
FIG. 3 is a top view of an array substrate according to an embodiment of the present invention.

The first embodiment of the invention provides an array substrate. FIG. 3 illustrates a plan view of the array substrate 100. The array substrate 100 comprises a plurality of gate lines 13 and a plurality of data lines 14, and these gate lines 13 and data lines 14 intersect each other to define a plurality of sub-pixel units in an array arrangement. Each sub-pixel unit, for example, is used to display a pixel point, for example, of some kind of color (e.g., red, green or blue). The following description will be directed to one sub-pixel unit or two sub-pixel units adjacent to each other in one row.

The array substrate 100 comprises a pixel electrode layer 10 and a common electrode layer 20. The common electrode layer is provided with a plurality of common electrodes 21, 22, and the pixel electrode layer is provided with a plurality of pixel electrodes 11, 12. Each sub-pixel unit comprises a pixel electrode and a thin film transistor T as a switching element. For example, the gate of the thin film transistor T is electrically connected with a gate line, the source is electrically connected with a data line, and the drain is electrically connected with a pixel electrode of the corresponding sub-pixel unit. Projection of each common electrode, projected in a vertical direction onto the pixel electrode layer, overlaps or partially overlaps with a corresponding pixel electrode. That is, projection lines of edges of a common electrode of the common electrode layer, projected in a vertical direction onto the pixel electrode layer, are located on one of the pixel electrodes of the pixel electrode layer.

In each sub-pixel unit, the pixel electrode is, for example, a plate-like electrode; the common electrode comprises a slit-portion which is formed with a plurality of slits, for example, parallel to each other; and the slit-portion, for example, is used as a portion of the sub-pixel for displaying.

Figure 4:
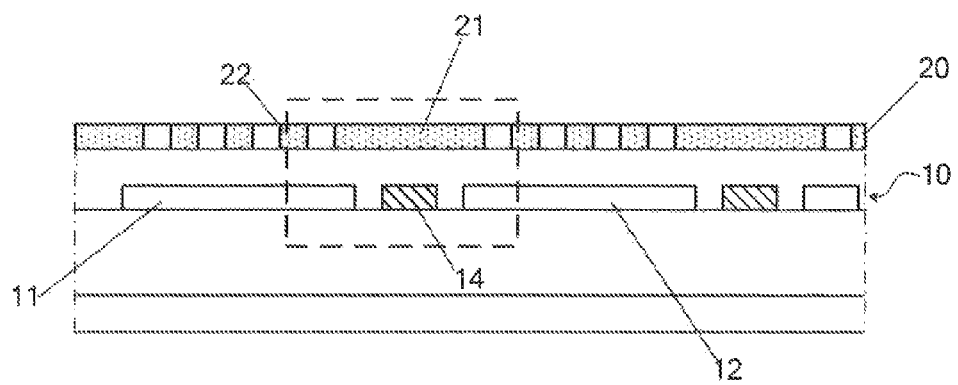
FIG. 4 is a schematic illustration of a structural relationship between a pixel electrode layer and a common electrode layer in an array substrate according to an embodiment of the present invention.
Figure 5:
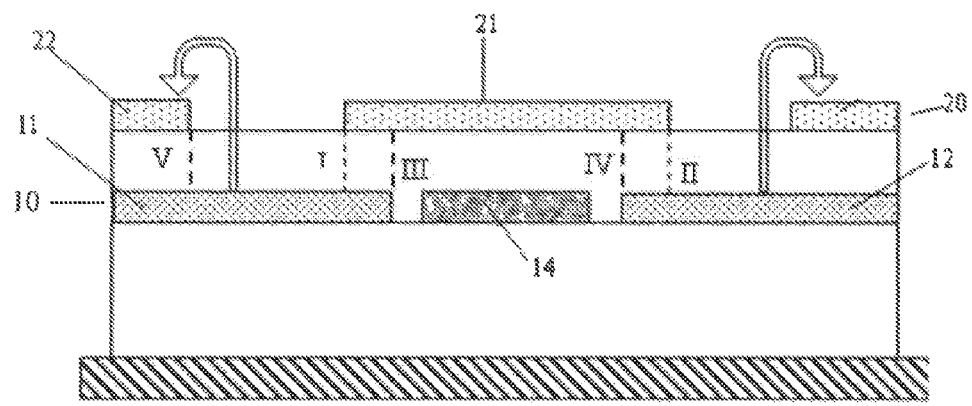
FIG. 5 is an enlarged view of the portion in the broken-lined block in FIG. 4.

FIG. 4 is a schematic illustration of a structural relationship between the pixel electrode layer and the common electrode layer in the array substrate of the first embodiment of the invention, showing a cross-sectional view taken along the line A-A in FIG. 3; FIG. 5 is an enlarged view of the portion in the broken-lined block in FIG. 4.

Figure 1:
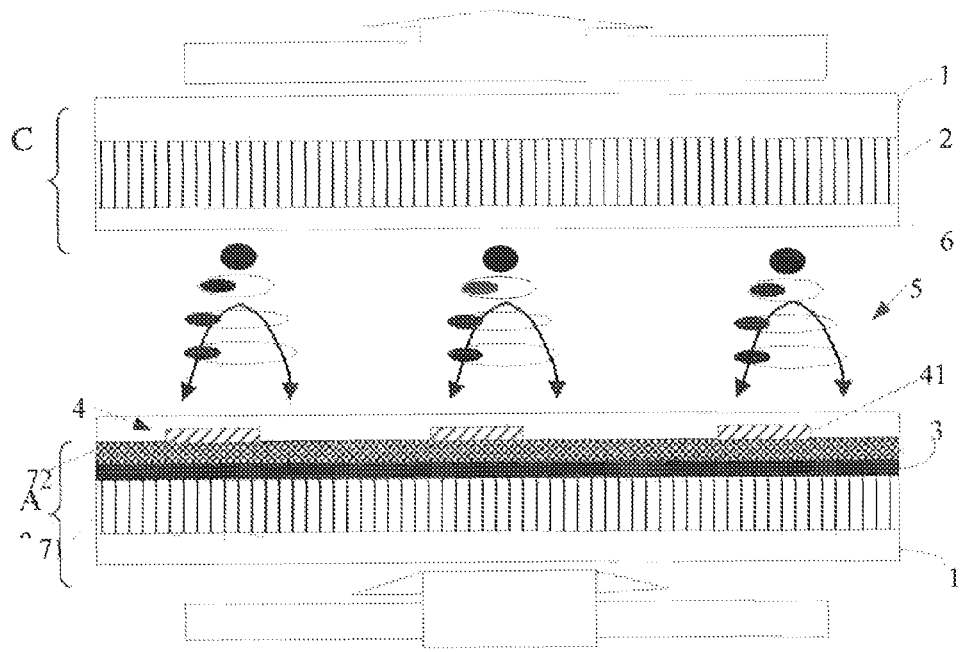
FIG. 1 is a cross-sectional view of a structure of a conventional ADS-type display.

The array substrate of the first embodiment of the invention can be used in a liquid crystal panel; the liquid crystal panel comprises an array substrate, an opposing substrate and a liquid crystal layer sandwiched between the array substrate and the opposing substrate; the array substrate comprises a pixel electrode layer and a common electrode layer, the pixel electrode layer and the common electrode layer being located on different layers respectively and being able to form a super-dimensional electric field therebetween to drive the liquid crystal layer. The structure of the liquid crystal panel according to the embodiment of the present invention is generally similar to the conventional ADS-type liquid crystal panel shown in FIG. 1, which is no more described here.

As shown in FIG. 4 and FIG. 5, in the array substrate of the first embodiment of the invention, the common electrode layer 20 is parallel to the pixel electrode layer 10; the common electrode layer 20 is located above the pixel electrode layer 10. Compared with the conventional structure shown in FIG. 2, the array substrate of the first embodiment of the invention makes an improvement in the relative structure between the pixel electrodes 11, 12 on the pixel electrode layer 10 and the common electrodes 21, 22 on the common electrode layer 20, so that vertical projection of each common electrode, projected on the pixel electrode layer 10, overlaps or partially overlaps with a corresponding pixel electrode 11, 12, respectively; that is, projection lines of the edges of a common electrode 21, 22 of the common electrode layer, projected on the pixel electrode layer, are located on one of the pixel electrodes 11, 12 of the pixel electrode layer.

In the array substrate of the first embodiment of the invention, the common electrode layer 20 comprises a first common electrode 21. The projection line of a first edge of the first common electrode 21, projected in a direction perpendicular to the array substrate (a vertical direction) on the pixel electrode layer 10, is located on one pixel electrode, while the projection line of a second edge of the first common electrode 21, projected in the vertical direction onto the pixel electrode layer 10, is located on another pixel electrode. As shown in FIG. 5, the second edge of the first common electrode 21 and the first edge of the first common electrode 21 are two opposite edges.

More specifically, as shown in FIG. 4, the array substrate is provided with gate lines (not shown) and data lines 14; the pixel electrode layer 10 comprises a first pixel electrode 11 and a second pixel electrode 12, located at two opposite sides of a data line 14, respectively, that is, located in two sub-pixel units adjacent to each other in one row, respectively (as shown in FIG. 3). The first common electrode 21 is facing and parallel to the data line 14. In this embodiment, the first common electrode 21 is located directly above the data line 14, and the projection line I of the first edge of the first common electrode 21, projected in the vertical direction onto the pixel electrode layer 10, is located on the first pixel electrode 11; the projection line II of the second edge of the first common electrode 21, projected on the pixel electrode layer 10, is located on the second pixel electrode 12.

At the same time, as shown in FIG. 4, the projection line III of a first edge of the first pixel electrode 11, projected in the vertical direction on the common electrode layer 20, is located on the first common electrode 21; the projection line IV of a first edge of the second pixel electrode 12, projected in the vertical direction on the common electrode layer 20, also is located on the first common electrode 21. As shown in the figure, the first edge of the first pixel electrode 11 is an edge adjacent to the data line 14, and the first edge of the second pixel electrode 12 is also an edge adjacent to the data line 14; that is, the first edge of the first pixel electrode 11 and the first edge of the second pixel electrode 12, are two adjacent edges.

The skilled in the art should understand that, according to the principle of displaying, after power supplying, electrical potential difference occurs between each of the first pixel electrode 11 and the second pixel electrode 12 and the first common electrode 21, respectively.

In addition, as shown in FIG. 4 and FIG. 5, the common electrode layer 20 further comprises a common electrode located at an outer side of the first common electrode 21, that is, a second common electrode 22, as shown in FIG. 4 and FIG. 5. Here, as shown in FIG. 3, the second common electrode 22 is a portion of common electrodes located in a pixel unit region for forming slit-electrodes; while the first common electrode 21 is a portion for laterally connecting the second common electrodes 22 in two adjacent pixel units, which is presented over the data line 14 and overlaps the data line 14.

As shown in FIG. 4, the projection line V of a first edge of the second common electrode 22, projected in the vertical direction onto the pixel electrode layer 10, is located on one pixel electrode 11, and the projection line (not shown) of a second edge of the second common electrode 22, projected on the pixel electrode layer 10, also is located on one pixel electrode, so that the vertical projection of the second common electrode 22, projected on the pixel electrode layer 10, overlaps with one of the pixel electrodes. As shown in FIG. 4, in this embodiment, when the second common electrode 22 is a common electrode at the left side of the first common electrode 21, the one of the pixel electrodes is the first pixel electrode 11 in the pixel electrode layer 10.

The above, with reference to FIGS. 3-5, and by taking as an example that the common electrode layer is provided with three common electrodes while the pixel electrode layer is provided with two pixel electrodes, the structure between the pixel electrode layer and the common electrode layer in the array substrate of the first embodiment of the invention is described. With reference to the illustrations of FIG. 4 and FIG. 5, the array substrate comprises a plurality of common electrodes; projection lines of two opposite edges of each common electrode, projected in the vertical direction onto the pixel electrode layer, are both located on a corresponding pixel electrode, forming an overlapping structure when viewed in the vertical direction. Likewise, the array substrate comprises a plurality of pixel electrodes; projection lines of two opposite edges of each pixel electrode, projected in the vertical direction on the common electrode layer, are located on a corresponding common electrode, respectively, forming an overlapping structure when viewed in the vertical direction.

Figure 2:
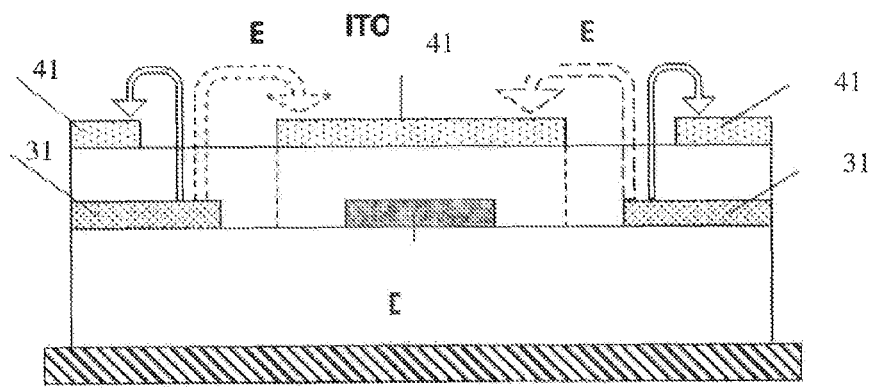
FIG. 2 is a schematic illustration of a structural relationship between a pixel electrode and a common electrode in a conventional ADS-type display.

By way of the above-described arrangement, since a pixel electrode and an adjacent common electrode overlap each other long a light incident direction (perpendicular to directions of the pixel electrode layer 10 and the common electrode layer 20), and a common electrode and an adjacent pixel electrode also overlap each other, occurrence of a non-uniform light-transmission phenomenon at a periphery of a pixel electrode as shown in FIG. 2 can be avoided, and therefore a more uniform light-transmission effect can be achieved.

In contrast to a conventional array substrate, the array substrate of the first embodiment of the invention may use a method of increasing widths of pixel electrodes, a method of increasing widths of common electrodes, or a method of increasing widths of pixel electrodes and widths of common electrodes simultaneously, to achieve the technical solutions of the embodiments of the invention.

For the array substrate shown in FIG. 4 and FIG. 5, by taking that a common electrode layer is located above a pixel electrode layer as an example, the structure of the first embodiment of the invention is described. When a pixel electrode layer is located above a common electrode layer, a similar structure can be provided, likewise, which is no more described in detail here.

Second Embodiment

The second embodiment of the present invention provides a liquid crystal panel, the liquid crystal panel comprising: an array substrate, an opposing substrate (e.g. a color-filter substrate), and a liquid crystal layer filled between the array substrate and the opposing substrate; the array substrate is provided with a pixel electrode layer and a common electrode layer; an electric field is formed between the pixel electrode layer and the common electrode layer for causing the liquid crystal molecules of the liquid crystal layer to rotate; the common electrode layer is provided with a plurality of common electrodes, the pixel electrode layer is provided with a plurality of pixel electrodes, and projection of each common electrode, projected on the pixel electrode layer, overlaps or partially overlaps with a corresponding pixel electrode. That is, projection lines of edges of the common electrode of the common electrode layer, projected on the pixel electrode layer, is located on one of the pixel electrodes of the pixel electrode layer.

The liquid crystal panel of the second embodiment adopts an array substrate of the first embodiment. When the opposing substrate is a color-filter substrate, the color-filter substrate comprises: for example, a glass substrate or a plastic substrate as a base substrate, as well as a color-filter layer. The color-filter layer may have, for example, red, green and blue sub-pixel units, corresponding to the sub-pixel units of the array substrate. When the opposing substrate is not a color-filter substrate, for example, the array substrate is further formed thereon with a color-filter layer, and accordingly comprises, for example, red, green and blue sub-pixel units.

Third Embodiment

The third embodiment of the present invention further provides a display device, including liquid crystal display devices and other types of display devices. The liquid crystal display device may be a liquid crystal television, a mobile phone, a liquid crystal display and the like, which comprises a color-filter substrate and an array substrate of the first embodiment as described above. The other types of display devices mentioned above, such as electronic paper, may not comprise a color-filter substrate, but comprise an array substrate in the embodiments as described above.

Here, description is given by taking a liquid crystal display device as an example. The liquid crystal display device comprises a liquid crystal panel, and the liquid crystal panel comprises: an array substrate, an opposing substrate (e.g. a color-filter substrate), and a liquid crystal layer filled between the array substrate and the opposing substrate; the array substrate is provided with a pixel electrode layer and a common electrode layer; an electric field is formed between the pixel electrode layer and the common electrode layer for causing the liquid crystal molecules of the liquid crystal layer to rotate; the common electrode layer is provided with a plurality of common electrodes, and the pixel electrode layer is provided with a plurality of pixel electrodes; projection of each common electrode, projected on the pixel electrode layer, overlaps or partially overlaps with a corresponding pixel electrode.

The liquid crystal display device of the third embodiment adopts a liquid crystal panel as described in the second embodiment. Besides, the liquid crystal display device may further comprise a backlight, a driving circuit and other components.

The above description is merely the preferred implementations of the present invention. It should be noted that, for the ordinary skilled in the art, improvements and modifications can be made without departing from the principles of the present invention, also these improvements and modifications should be regarded as within the protection scope of the present invention.

The invention claimed is:

1. An array substrate comprising a pixel electrode layer and a common electrode layer,
   wherein the common electrode layer is provided with a plurality of common electrodes, and the pixel electrode layer is provided with a plurality of pixel electrodes, and
   wherein projection of each common electrode, projected in a direction vertical to the pixel electrode layer, overlaps or partially overlaps with a corresponding pixel electrode; and
   wherein the pixel electrode layer comprises a first pixel electrode and a second pixel electrode adjacent to each other, and the common electrode layer comprises a first common electrode located over a data line, and
   wherein projection lines of two opposite edges of the first common electrode, projected in a direction vertical to the pixel electrode layer, are respectively located on the first pixel electrode and on the second pixel electrode; and
   the data line and the pixel electrode layer are disposed in the same layer; the first pixel electrode and the second pixel electrode of the pixel electrode layer are located respectively at two sides of the data line.

2. The array substrate according to claim 1, wherein projection lines of adjacent edges of the first pixel electrode and the second pixel electrode, projected in a direction vertical to the common electrode layer, are both located on the first common electrode.

3. The array substrate according to claim 1, wherein the common electrode layer further comprises a second common electrode, and projection lines of two opposite edges of the second common electrode, projected in a direction vertical to the pixel electrode layer, are located on a same pixel electrode.

4. The array substrate according to claim 1, wherein the common electrode layer is parallel to the pixel electrode layer, and the common electrode layer is located above the pixel electrode layer.

5. A liquid crystal panel, comprising an opposing substrate and an array substrate, wherein the array substrate comprises a pixel electrode layer and a common electrode layer,
   wherein the common electrode layer is provided with a plurality of common electrodes, and the pixel electrode layer is provided with a plurality of pixel electrodes, and
   wherein projection of each common electrode, projected in a direction vertical to the pixel electrode layer, overlaps or partially overlaps with a corresponding pixel electrode; and
   wherein the pixel electrode layer comprises a first pixel electrode and a second pixel electrode adjacent to each other, and the common electrode layer comprises a first common electrode located over a data line,
   wherein projection lines of two opposite edges of the first common electrode, projected in a direction vertical to the pixel electrode layer, are respectively located on the first pixel electrode and on the second pixel electrode,
   the data line and the pixel electrode layer are disposed in the same layer: the first pixel electrode and the second pixel electrode of the pixel electrode layer are located respectively at two sides of the data line.

6. The liquid crystal panel according to claim 5, wherein projection lines of adjacent edges of the first pixel electrode and the second pixel electrode, projected in a direction vertical to the common electrode layer, are both located on the first common electrode.

7. The liquid crystal panel according to claim 5, wherein the common electrode layer further comprises a second common electrode, and projection lines of two opposite edges of the second common electrode, projected in a direction vertical to the pixel electrode layer, are located on a same pixel electrode.

8. The liquid crystal panel according to claim 5, wherein the common electrode layer is parallel to the pixel electrode layer, and the common electrode layer is located above the pixel electrode layer.

9. A display device, comprising an array substrate, the array substrate comprising a pixel electrode layer and a common electrode layer;
   wherein the common electrode layer is provided with a plurality of common electrodes, and the pixel electrode layer is provided with a plurality of pixel electrodes, and
   wherein projection of each common electrode, projected in a direction vertical to the pixel electrode layer, overlaps or partially overlaps with a corresponding pixel electrode;
   wherein the pixel electrode layer comprises a first pixel electrode and a second pixel electrode adjacent to each other, and the common electrode layer comprises a first common electrode located over a data line, wherein projection lines of two opposite edges of the first common electrode, projected in a direction vertical to the pixel electrode layer, are respectively located on the first pixel electrode and on the second pixel electrode; and the data line and the pixel electrode layer are disposed in the same layer; the first pixel electrode and the second pixel electrode of the pixel electrode layer are located respectively at two sides of the data line.

10. The display device according to claim 9, wherein projection lines of adjacent edges of the first pixel electrode and the second pixel electrode, projected in a direction vertical to the common electrode layer, are both located on the first common electrode.

11. The display device according to claim 9, wherein the common electrode layer further comprises a second common electrode, and projection lines of two opposite edges of the second common electrode, projected in a direction vertical to the pixel electrode layer, are located on a same pixel electrode.

12. The display device according to claim 9, wherein the common electrode layer is parallel to the pixel electrode layer, and the common electrode layer is located above the pixel electrode layer.

* * * * *